US012767232B2

(12) United States Patent
Nagasawa

(10) Patent No.: US 12,767,232 B2
(45) Date of Patent: Oct. 20, 2026

(54) FRONT FRAME STRUCTURE FOR ELECTRIC VEHICLE

(71) Applicant: SUBARU CORPORATION, Tokyo (JP)

(72) Inventor: Isamu Nagasawa, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 317 days.

(21) Appl. No.: 18/429,929

(22) Filed: Feb. 1, 2024

(65) Prior Publication Data

US 2024/0278847 A1 Aug. 22, 2024

(30) Foreign Application Priority Data

Feb. 21, 2023 (JP) ................................ 2023-025422

(51) Int. Cl.
*B62D 25/08* (2006.01)
*B62D 25/02* (2006.01)

(52) U.S. Cl.
CPC ........... *B62D 25/02* (2013.01); *B62D 25/085* (2013.01)

(58) Field of Classification Search
CPC ...... B62D 25/02; B62D 25/08; B62D 25/082; B62D 25/085; B62D 21/11; B62D 21/152; B60L 3/0007; B60R 19/18; B60R 19/34; B60R 2019/1806
USPC ........................................................ 296/204
See application file for complete search history.

(56) References Cited

U.S. PATENT DOCUMENTS 4,205,872 A * 6/1980 Bollinger ............. B62D 23/005 280/798
4,747,636 A * 5/1988 Harasaki ................. B60R 22/04 296/203.03
4,887,862 A * 12/1989 Bassi ................... B62D 27/065 52/783.17
4,951,964 A * 8/1990 Sakamoto ............ B62D 21/155 180/291
6,099,039 A * 8/2000 Hine ...................... B62D 21/11 180/311

(Continued)

FOREIGN PATENT DOCUMENTS

CN 106394685 A * 2/2017 ............. B60R 19/34
CN 106275086 B * 8/2019 ............. B62D 21/02

(Continued)

*Primary Examiner* — Hilary L Gutman

(74) *Attorney, Agent, or Firm* — Smith, Gambrell & Russell, LLP

(57) ABSTRACT

A front frame structure for an electric vehicle includes a front side frame having a wall-shaped portion with a dimension in a height direction from a bottom portion to an upper portion of a motor room, and an arm-shaped portion that protrudes from an upper portion of a front end portion of the wall-shaped portion; a sub-frame that is joined to a bottom portion of the wall-shaped portion and a front end portion of the arm-shaped portion and that has an annular opening between the sub-frame and the arm-shaped portion; and a load transmission member disposed in the annular opening. The load transmission member includes two or more diagonal members coupled to each other. The load transmission member is joined to at least the front end portion of the arm-shaped portion, a rear end portion of the arm-shaped portion, and an intermediate portion of the sub-frame.

18 Claims, 5 Drawing Sheets

(56) References Cited

U.S. PATENT DOCUMENTS

| | | | | |
|---|---|---|---|---|
| 6,705,667 | B1 * | 3/2004 | Bartesch | B62D 25/20<br>296/203.02 |
| 7,080,875 | B2 * | 7/2006 | Kim | B62D 25/02<br>296/187.09 |
| 8,585,133 | B2 * | 11/2013 | Yasuhara | B62D 25/2018<br>296/203.03 |
| 8,967,701 | B2 * | 3/2015 | Barbat | B62D 21/152<br>296/203.02 |
| 9,487,236 | B2 * | 11/2016 | Ozawa | B62D 21/152 |
| 9,533,711 | B2 * | 1/2017 | Hirsch | B62D 21/02 |
| 12,594,996 | B2 * | 4/2026 | Yoshida | B62D 21/155 |
| 2002/0063445 | A1 * | 5/2002 | Takeuchi | B62D 25/16<br>296/203.02 |
| 2003/0178834 | A1 * | 9/2003 | Grimm | B62D 21/12<br>280/781 |
| 2003/0184124 | A1 * | 10/2003 | Yamaguchi | B62D 21/152<br>296/204 |
| 2004/0113462 | A1 * | 6/2004 | Winter | B62D 25/08<br>296/203.02 |
| 2009/0058142 | A1 * | 3/2009 | Park | B62D 21/00<br>296/193.07 |
| 2011/0095568 | A1 * | 4/2011 | Terada | B62D 25/088<br>296/187.09 |
| 2014/0291053 | A1 * | 10/2014 | Nagasawa | B62D 25/088<br>296/187.1 |
| 2019/0300056 | A1 * | 10/2019 | Yamauchi | B62D 25/081 |
| 2021/0253171 | A1 * | 8/2021 | Yotsuyanagi | B62D 21/152 |
| 2021/0253172 | A1 * | 8/2021 | Shimoda | B62D 21/152 |
| 2021/0331640 | A1 * | 10/2021 | Iwamoto | B60R 19/26 |
| 2024/0278838 | A1 * | 8/2024 | Nagasawa | B62D 25/082 |
| 2024/0278839 | A1 * | 8/2024 | Nagasawa | B62D 25/082 |
| 2024/0278843 | A1 * | 8/2024 | Nagasawa | B62D 21/155 |
| 2024/0278850 | A1 * | 8/2024 | Nagasawa | B62D 25/085 |
| 2024/0300581 | A1 * | 9/2024 | Nagasawa | B62D 25/084 |
| 2025/0026406 | A1 * | 1/2025 | Nagasawa | B60K 11/04 |
| 2025/0026408 | A1 * | 1/2025 | Nagasawa | B62D 21/11 |
| 2025/0026412 | A1 * | 1/2025 | Nagasawa | B62D 21/152 |
| 2025/0178673 | A1 * | 6/2025 | Sekiguchi | B62D 29/008 |
| 2025/0236337 | A1 * | 7/2025 | Nishimura | B62D 21/11 |

FOREIGN PATENT DOCUMENTS

| | | | | | |
|---|---|---|---|---|---|
| CN | 117360631 | A | * | 1/2024 | B62D 25/082 |
| CN | 117601791 | A | * | 2/2024 | B60R 19/34 |
| CN | 118205617 | A | * | 6/2024 | B62D 21/11 |
| CN | 118928553 | A | * | 11/2024 | B62D 65/02 |
| DE | 10026393 | A1 | * | 11/2001 | B62D 21/155 |
| DE | 102006013548 | C5 | * | 1/2018 | B62D 21/155 |
| DE | 102020214064 | A1 | * | 2/2022 | B62D 21/155 |
| JP | 2000108937 | A | * | 4/2000 | |
| JP | 2007326578 | A | * | 12/2007 | |
| JP | 2008174179 | A | * | 7/2008 | |
| JP | 2012-201284 | A | | 10/2012 | |
| JP | 2014196008 | A | * | 10/2014 | |
| JP | 2017013794 | A | * | 1/2017 | |
| WO | WO-2009008426 | A1 | * | 1/2009 | B62D 25/082 |
| WO | WO-2014097513 | A1 | * | 6/2014 | B62D 21/11 |

* cited by examiner

FRONT FRAME STRUCTURE FOR ELECTRIC VEHICLE

CROSS-REFERENCE TO RELATED APPLICATIONS

The present application claims priority from Japanese Patent Application No. 2023-025422 filed on Feb. 21, 2023, the entire contents of which are hereby incorporated by reference.

BACKGROUND

The disclosure relates to a front frame structure for an electric vehicle including a motor room in a front portion of a vehicle body.

Generally, a motor room is provided in a front portion of a vehicle body of an electric vehicle. A power unit including an electric motor is mounted in the motor room. The power unit of the electric vehicle is a rigid body. Accordingly, in an event of a full-wrap frontal collision or a small-overlap frontal collision, it is almost impossible for the power unit to absorb an impact. Moreover, the power unit of the electric vehicle is smaller in size than a power unit of a reciprocating engine. Accordingly, a control unit including high-voltage members such as an inverter and a direct current-direct current (DC/DC) converter is often mounted in an upper portion of the motor room.

If the power unit, which is a rigid body, is retreated by an impact in an event of a head-on collision, a vehicle cabin may be deformed. Moreover, the control unit, which is a high-voltage member, may be crushed by the impact in the event of the head-on collision. Thus, in the event of the head-on collision, the impact in the event of the head-on collision is to be absorbed at least in front of the power unit and the control unit.

Moreover, the electric vehicle uses a large-capacity battery to ensure a sufficient cruising distance. In many electric vehicles, a battery chamber is provided in an entire space under a floor of a vehicle cabin, and a battery is accommodated in the battery chamber. Thus, in an event of a frontal collision, deformation of the vehicle cabin and the battery chamber is to be reduced to effectively protect the battery.

For example, Japanese Unexamined Patent Application Publication (JP-A) No. 2012-201284 discloses an electric vehicle having one main frame extending in a front-rear direction of a vehicle body at the center in a vehicle width direction of the vehicle body. The main frame accommodates a battery in a portion extending rearward with respect to front wheels. Thus, the main frame disclosed in JP-A No. 2012-201284 can absorb an impact in an event of a head-on collision by a portion extending forward with respect to the front wheels.

SUMMARY

An aspect of the disclosure provides a front frame structure for an electric vehicle including a front side frame, a sub-frame, and a load transmission member. The front side frame has a wall-shaped portion and an arm-shaped portion. The wall-shaped portion has a wall shape with a dimension in a height direction from a bottom portion to an upper portion of a motor room and extends in a front-rear direction of a vehicle body in a rear region of the motor room. The arm-shaped portion protrudes from an upper portion of a front end portion of the wall-shaped portion and extends in the front-rear direction of the vehicle body in a front region of the motor room. The sub-frame is joined to a bottom portion of the wall-shaped portion and a front end portion of the arm-shaped portion and has an annular opening between the sub-frame and the arm-shaped portion. The load transmission member is disposed in the annular opening. The load transmission member includes two or more diagonal members coupled to each other. The load transmission member is joined to at least the front end portion of the arm-shaped portion, a rear end portion of the arm-shaped portion, and an intermediate portion of the sub-frame.

BRIEF DESCRIPTION OF THE DRAWINGS

The accompanying drawings are included to provide a further understanding of the disclosure and are incorporated in and constitute a part of this specification. The drawings illustrate an embodiment and, together with the specification, serve to describe the principles of the disclosure.

DETAILED DESCRIPTION

The electric vehicle disclosed in JP-A No. 2012-201284 is originally designed as a dedicated frame structure.

Thus, cost may increase as compared with a frame structure for an electric vehicle designed based on a front frame structure that is used for a vehicle in which a conventional reciprocating engine is mounted.

Moreover, when an impact in an event of a head-on collision is intended to be absorbed by a front end portion of the main frame, a crush stroke (an expected amount of plastic deformation in a collision direction in the event of the head-on collision) of the main frame is set to be forward with respect to a power unit. However, when the crush stroke is intended to be ensured by the deformation of the main frame, a front overhang amount to the front with respect to the power unit increases, and design may be impaired.

It is desirable to provide a front frame structure for an electric vehicle. The front frame can be designed based on a front frame structure that is used for a vehicle in which a reciprocating engine is mounted, and can effectively protect a power unit or a control unit, and a vehicle cabin or a battery chamber from an impact in an event of a head-on collision without impairing design.

In the following, an embodiment of the disclosure is described in detail with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

Figure 1:
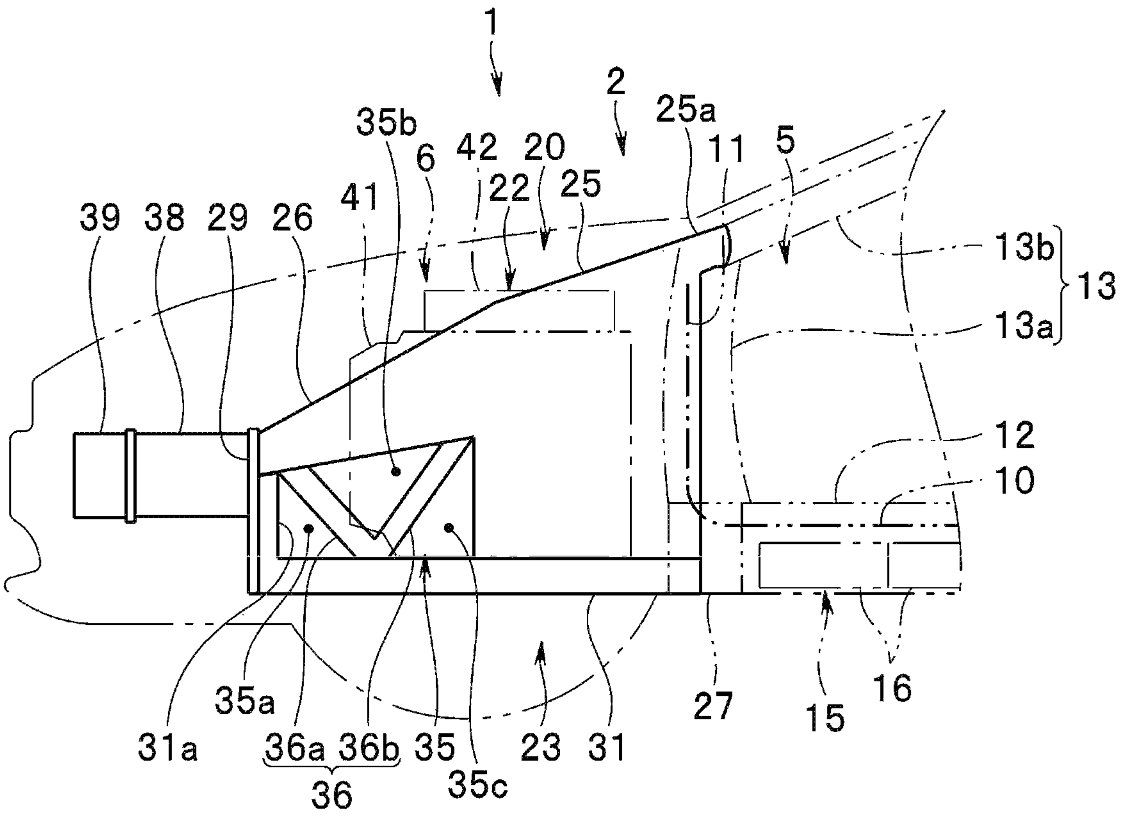
FIG. 1 is a side view illustrating a main portion of a front frame structure for an electric vehicle.

FIG. 1 is a side view schematically illustrating a front frame structure for an electric vehicle according to the embodiment.

Figure 2:
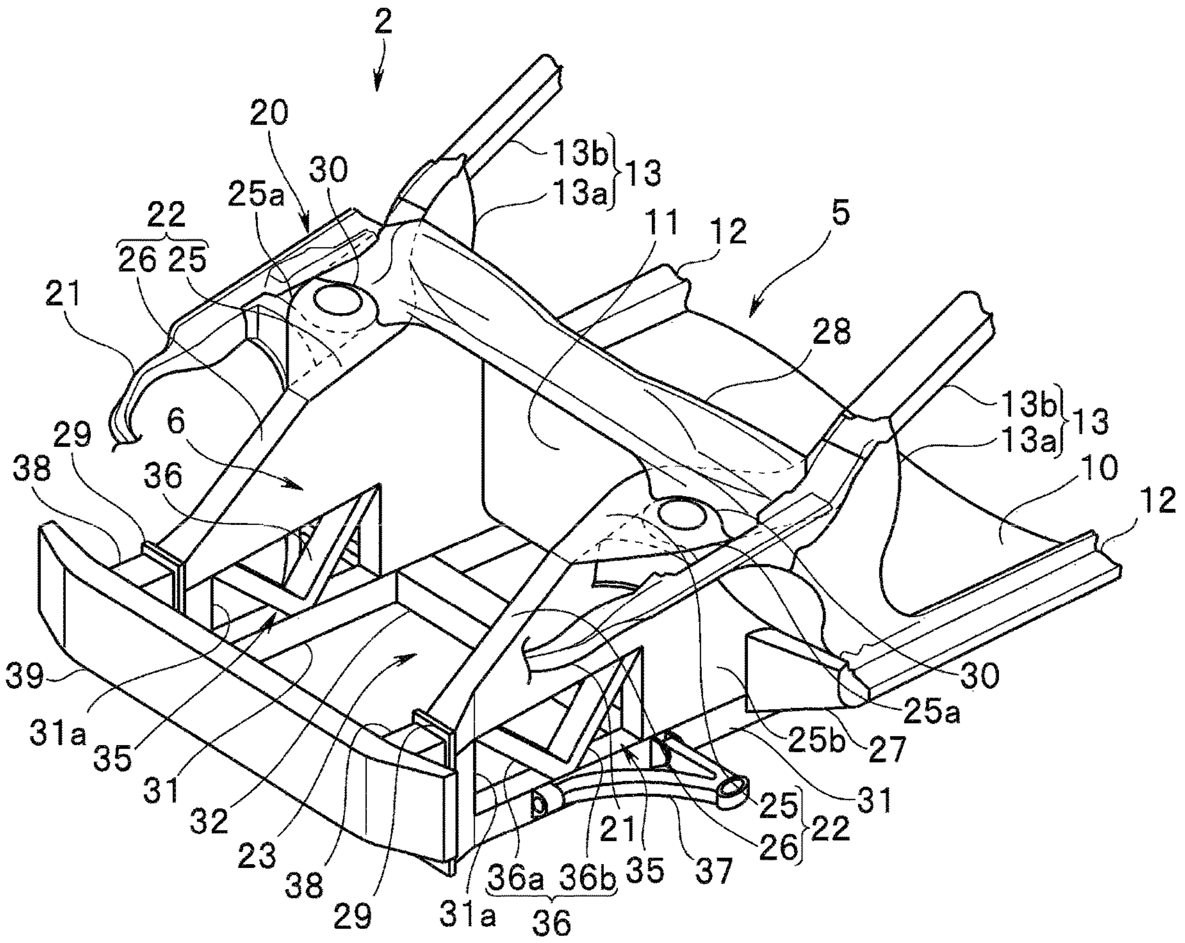
FIG. 2 is a perspective view illustrating the front frame structure for the electric vehicle.

As illustrated in FIGS. 1 and 2, a vehicle body 2 of an electric vehicle 1 includes a cabin 5 and a motor room 6 provided in front of the cabin 5.

The cabin 5 is provided in a substantially central portion in a front-rear direction of the vehicle body 2. The cabin 5 includes a floor panel 10, a toe board 11, a pair of left and right side sills 12, and a pair of left and right front pillars 13.

The floor panel 10 is formed of, for example, a sheet metal member having a substantially planar shape. The floor panel 10 constitutes a floor surface of the cabin 5. A battery chamber 15 is provided below the floor panel 10. Multiple batteries 16 are accommodated in the battery chamber 15.

The toe board 11 is formed of a sheet metal member or the like that rises upward from a distal end of the floor panel 10. The toe board 11 constitutes a partition wall that separates the cabin 5 from the motor room 6.

Each side sill 12 is, for example, a hollow member having a closed cross-sectional shape. These side sills 12 are formed by, for example, joining multiple panels. The side sills 12 extend in the front-rear direction of the vehicle body 2 at left and right side portions of the floor panel 10. Further, the side sills 12 are joined to the left and right side portions of the floor panel 10.

Each front pillar 13 is, for example, a hollow member having a closed cross-sectional shape. These front pillars 13 are formed by, for example, joining multiple panels. Each front pillar 13 has a lower front pillar 13*a* and an upper front pillar 13*b*.

A lower end portion of each lower front pillar 13*a* is joined to a front end portion of the corresponding side sill 12. Left and right side portions of the toe board 11 are joined to the lower front pillars 13*a*.

A lower end portion of each upper front pillar 13*b* is joined to an upper end portion of the corresponding lower front pillar 13*a*. Each upper front pillar 13*b* extends upward of the vehicle body 2 in a state of being inclined rearward more than each lower front pillar 13*a*.

A main portion of the motor room 6 is constituted by a front frame structure 20 provided in front of the toe board 11. The front frame structure 20 includes a pair of left and right upper side frames 21 (see FIGS. 2 and 3), a pair of left and right front side frames 22, and a cradle 23.

Each upper side frame 21 is formed of, for example, a sheet metal. Rear end portions of these upper side frames 21 are joined to the upper end portions of the lower front pillars 13*a*. Thus, the upper side frames 21 extend in the front-rear direction of the vehicle body 2 in an area above left and right side portions of the motor room 6.

Each front side frame 22 is, for example, a hollow member having a closed cross-sectional shape. These front side frames 22 are formed by, for example, joining multiple panels. These front side frames 22 extend in the front-rear direction of the vehicle body 2 on inner sides with respect to the upper side frames 21 in a vehicle width direction.

Each front side frame 22 has a wall-shaped portion 25 and an arm-shaped portion 26.

The wall-shaped portion 25 constitutes a rear region of the front side frame 22.

The wall-shaped portion 25 has, for example, a dimension in a height direction from a bottom portion to an upper portion of the motor room 6. For example, the wall-shaped portion 25 has a dimension from the bottom portion of the motor room 6 to a height substantially the same as the height of the upper side frame 21 in the height direction of the vehicle body 2.

Moreover, the wall-shaped portion 25 has a length extending from the toe board 11 to the vicinity of the center of the motor room 6 in the front-rear direction of the vehicle body 2. Thus, the wall-shaped portion 25 has a wall shape having a substantially rectangular shape in a side view.

A rear end portion of the wall-shaped portion 25 is joined to the toe board 11. A lower portion of the rear end portion of the wall-shaped portion 25 is joined to the side sill 12 via a torque box 27. Thus, the wall-shaped portion 25 can disperse part of an impact load transmitted from the front of the vehicle body 2 to the side sill 12 in an event of a frontal collision or the like of the vehicle 1.

Moreover, an upper panel 25*a* forming an upper surface of the wall-shaped portion 25 is expanded toward the rear and on an outer side in the vehicle width direction of the vehicle body 2.

A portion of the upper panel 25*a* expanded toward the rear of the vehicle body 2 is joined to an upper portion of the lower front pillar 13*a*. Thus, the wall-shaped portion 25 can disperse part of an impact load transmitted from the front of the vehicle body 2 to the front pillar 13 in an event of a frontal collision or the like of the vehicle 1.

Left and right end portions of a cowling cover 28 extending in the vehicle width direction are further joined to the upper portions of the lower front pillars 13*a* to which the upper panels 25*a* and the upper side frames 21 are joined.

A portion of the upper panel 25*a* expanded on the outer side in the vehicle width direction constitutes a portion of a suspension tower 30 together with an outer panel 25*b* forming an outer side surface of the wall-shaped portion 25. Thus, the suspension tower 30 is integrally formed with the front side frame 22. An upper end portion of the suspension tower 30 on the outer side in the vehicle width direction is joined to the upper side frame 21.

The arm-shaped portion 26 constitutes a front region of the front side frame 22. The arm-shaped portion 26 extends from an upper portion of a front end portion of the wall-shaped portion 25 toward the front of the vehicle body 2. Accordingly, the dimension in the height direction of the arm-shaped portion 26 is set to be smaller than the dimension in the height direction of the wall-shaped portion 25. Further, the dimension in the height direction of the arm-shaped portion 26 is set so as to gradually decrease from a rear side toward a front side of the arm-shaped portion 26. For example, an upper surface of the arm-shaped portion 26 is inclined forward at a predetermined depression angle. In contrast, a bottom surface of the arm-shaped portion 26 is substantially horizontal. Thus, the arm-shaped portion 26 has a tapered shape in which the thickness gradually decreases from the rear side toward the front side of the arm-shaped portion 26.

In such a front side frame 22, the rigidity of the rear region constituted by the wall-shaped portion 25 is relatively higher than the rigidity of the front region constituted by the arm-shaped portion 26.

Figure 3:
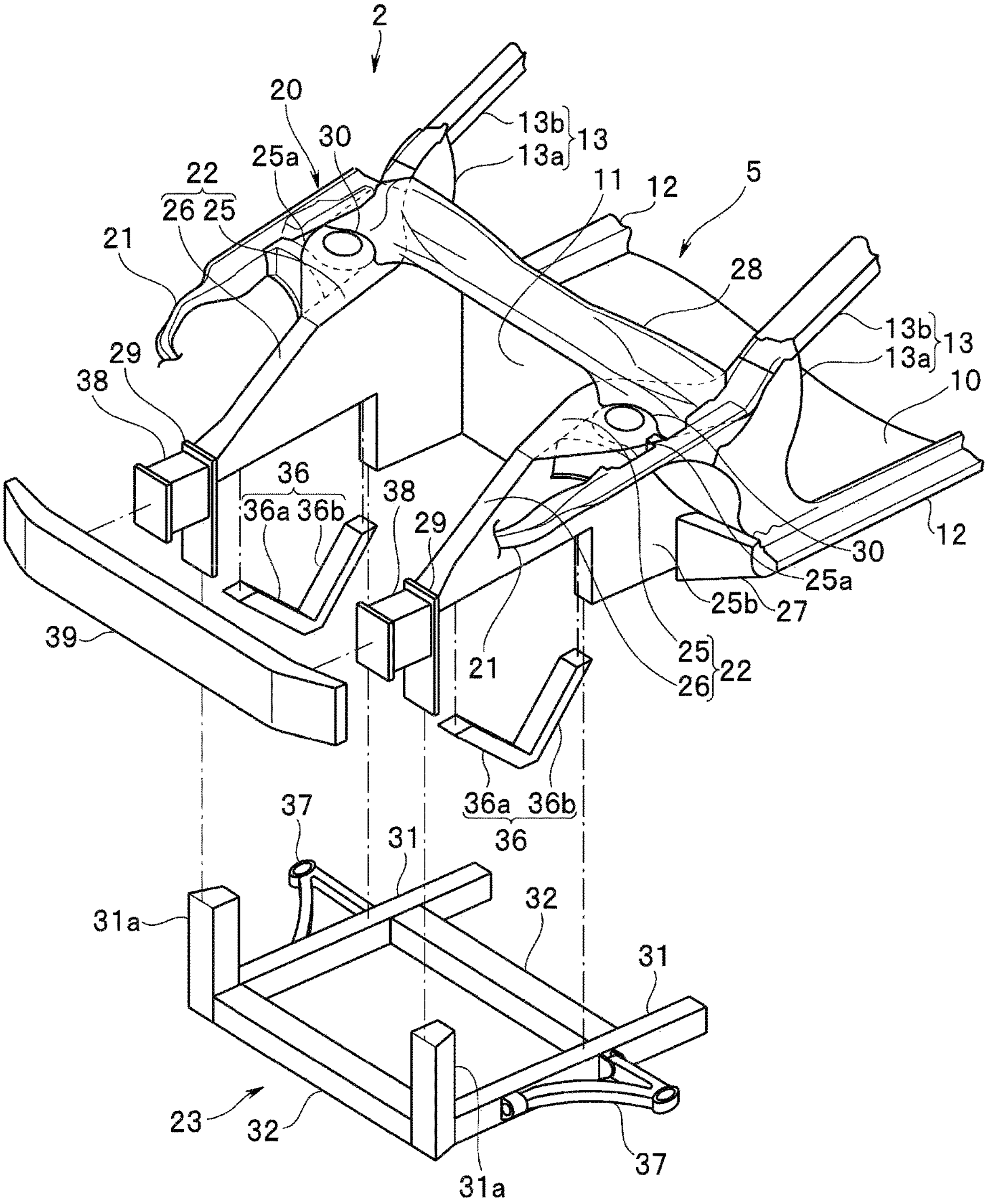
FIG. 3 is an exploded perspective view illustrating the front frame structure for the electric vehicle.

As illustrated in FIG. 3, the cradle 23 includes, for example, a pair of left and right lower side frames 31 as sub-frames, and a pair of front and rear cross members 32.

Each lower side frame 31 is, for example, a hollow member having a closed cross-sectional shape. Each lower side frame 31 is formed by, for example, joining multiple panels. These lower side frames 31 extend in the front-rear direction of the vehicle body 2 in a state with an interval in the vehicle width direction equivalent to that between the pair of front side frames 22.

A protrusion 31*a* is provided in a front portion of each lower side frame 31. Each protrusion 31*a* protrudes upward in a state of being substantially orthogonal to the corresponding lower side frame 31.

Moreover, a suspension arm 37 is coupled to a surface on the outer side in the vehicle width direction of each lower side frame 31 (see FIGS. 2 and 3). Thus, each suspension arm 37 is supported by the cradle 23 so as to be swingable in an up-down direction.

Each cross member 32 is, for example, a hollow member having a closed cross-sectional shape. These cross members 32 are formed by, for example, joining multiple panels. The cross members 32 extend in the vehicle width direction in a state with a predetermined interval in the front-rear direction of the vehicle body 2.

Left and right end portions of each cross member 32 are joined to the lower side frames 31. Thus, the lower side frames 31 and the cross members 32 constitute the cradle 23 having a so-called ladder structure.

The cradle 23 configured as described above is joined to each front side frame 22. For example, a rear region of each lower side frame 31 constituting the cradle 23 is joined to a lower portion of the corresponding wall-shaped portion 25. A front end portion of each lower side frame 31 is joined to a front end portion of the corresponding arm-shaped portion 26.

The front end portion of each lower side frame 31 is joined to the front end portion of the corresponding arm-shaped portion 26 via a bracket 29. For example, as illustrated in FIG. 3, each bracket 29 of the present embodiment is joined to the front end portion of the corresponding arm-shaped portion 26 in advance by welding or the like. The protrusion 31*a* of each lower side frame 31 is joined to the corresponding bracket 29. Thus, the front end portion of each lower side frame 31 is joined to the front end portion of the corresponding arm-shaped portion 26.

By joining the cradle 23 to each front side frame 22, the lower side frame 31 of the cradle 23 stiffens the front side frame 22.

A front portion of each front side frame 22 is constituted by the arm-shaped portion 26 extending from an upper region of the wall-shaped portion 25. Accordingly, an annular opening 35 penetrating in the vehicle width direction is formed in each of front left and right side portions of the motor room 6. In the present embodiment, the opening 35 has a rectangular shape in a side view.

A reinforcement 36 as a load transmission member is disposed in each opening 35. Each reinforcement 36 includes, for example, a first diagonal member 36*a* and a second diagonal member 36*b*. The first diagonal member 36*a* is, for example, inclined forward at a predetermined elevation angle. The second diagonal member 36*b* is, for example, inclined forward at a predetermined depression angle. A rear end portion of the first diagonal member 36*a* and a front end portion of the second diagonal member 36*b* are coupled to each other. Thus, each reinforcement 36 has a substantially V-shaped bent shape in a side view.

A front end portion of each reinforcement 36 is in contact with a joint portion between the front end portion of the arm-shaped portion 26 and an upper end portion of the protrusion 31*a*. That is, a front end portion of the first diagonal member 36*a* is in contact with the front end portion of the arm-shaped portion 26 and the upper end portion of the protrusion 31*a* on an upper side of the opening 35. The front end portion of each reinforcement 36 is joined to the arm-shaped portion 26.

An intermediate portion of each reinforcement 36 is in contact with an intermediate portion of the lower side frame 31. That is, the rear end portion of the first diagonal member 36*a* and the front end portion of the second diagonal member 36*b* are in contact with the intermediate portion of the lower side frame 31 on a lower side of the opening 35. The intermediate portion of each reinforcement 36 is joined to the lower side frame 31.

A rear end portion of each reinforcement 36 is joined to a rear end portion of the arm-shaped portion 26 and the front end portion of the wall-shaped portion 25. That is, a rear end portion of the second diagonal member 36*b* is joined to the rear end portion of the arm-shaped portion 26 and the front end portion of the wall-shaped portion 25 on the upper side of the opening 35. The rear end portion of each reinforcement 36 is joined to the arm-shaped portion 26.

With the joining, each reinforcement 36 has more joints on the upper side of the opening 35 than the joint on the lower side of the opening 35. In the present embodiment, for example, each reinforcement 36 has one joint with respect to the intermediate portion of the lower side frame 31 constituting the lower side of the opening 35. Moreover, each reinforcement 36 has one joint with respect to each of the front end portion and the rear end portion of the arm-shaped portion 26 constituting the upper side of the opening 35.

With the joints, each reinforcement 36 has a truss structure in each opening 35. That is, by disposing the reinforcement 36 in the opening 35, the inside of the opening 35 is partitioned into a first space 35*a*, a second space 35*b*, and a third space 35*c*.

The first space 35*a* is a space having a triangular shape in a side view surrounded by the lower side frame 31, the protrusion 31*a*, and the first diagonal member 36*a*. The second space 35*b* is a space having a triangular shape in a side view surrounded by the arm-shaped portion 26, the first diagonal member 36*a*, and the second diagonal member 36*b*. The third space 35*c* is a space having a triangular shape in a side view surrounded by the wall-shaped portion 25, the lower side frame 31, and the second diagonal member 36*b*.

By forming such a truss structure, each reinforcement 36 controls reaction force against collision energy (impact load) in an event of a frontal collision or the like.

The shape of each reinforcement 36 is not limited to the V-shape in a side view. For example, the shape of each reinforcement 36 may be a W-shape in a side view. In such a case, each reinforcement 36 has two joints with respect to the lower side frame 31 on the lower side of the opening 35. Each reinforcement 36 also has three joints with respect to the arm-shaped portion 26 side that is the upper side of the opening 35.

Moreover, each bracket 29 is provided with a crash box 38 protruding toward the front of the vehicle body 2. Further, a bumper beam 39 extending in the vehicle width direction is joined to a front end portion of each crash box 38.

A power unit 41 is accommodated in the motor room 6 configured as described above. The power unit 41 includes an electric motor and a transmission. The power unit 41 is mounted on each cross member 32 of the cradle 23 via a mount member (not illustrated).

Further, a control unit 42 is provided above the power unit 41. The control unit 42 includes an inverter, a DC/DC converter, and the like (not illustrated). Thus, the control unit 42 controls driving power or the like to be supplied from the batteries 16 to the electric motor.

An axle shaft or the like (not illustrated) for transmitting driving force of the power unit 41 to the front wheels can extend outward in the vehicle width direction through a gap of the reinforcement 36 in the opening 35.

Figure 4:
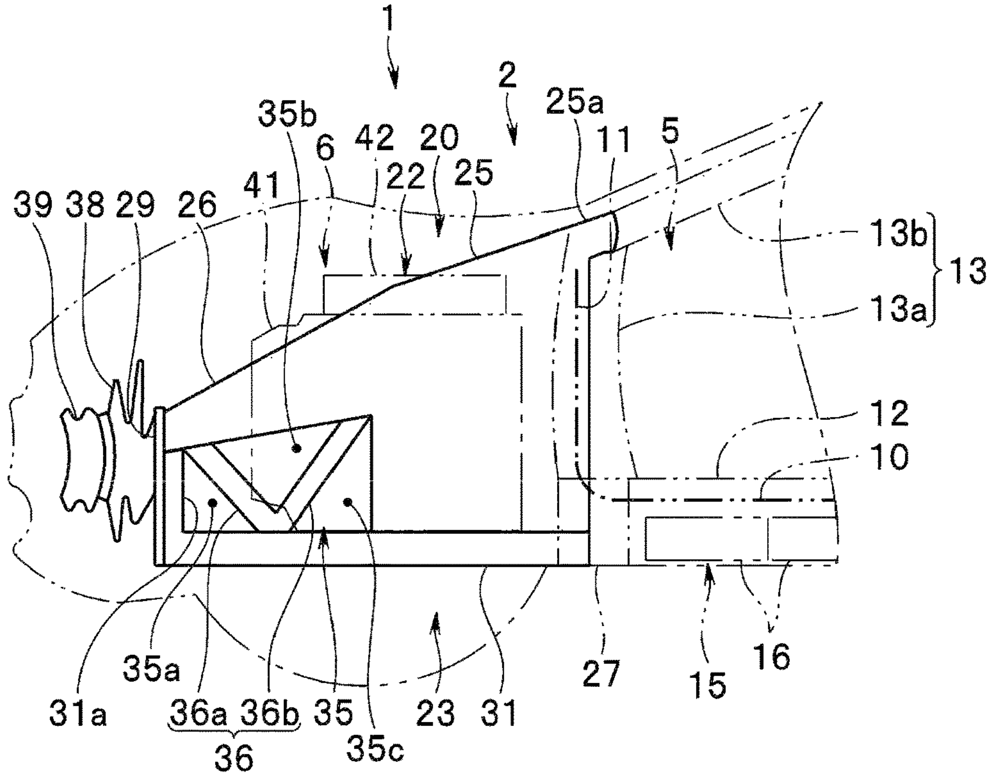
FIG. 4 is an explanatory view illustrating a behavior of the front frame structure in an initial stage in an event of a frontal collision.

When the vehicle 1 configured as described above is involved in a frontal collision, the bumper beam 39 and each crash box 38 are axially crushed in an initial stage of the collision (see FIG. 4).

In a subsequent middle stage of the collision, the arm-shaped portion 26 of each front side frame 22 and the corresponding lower side frame 31 of the cradle 23 start to be axially crushed. At this time, the axial crushing of each arm-shaped portion 26 and the corresponding lower side frame 31 is controlled by the corresponding reinforcement 36.

For example, collision energy transmitted to the crash box 38 is dispersed and transmitted to the arm-shaped portion 26, the protrusion 31*a*, and the first diagonal member 36*a*.

The collision energy transmitted to the protrusion 31*a* of the dispersed collision energy is transmitted to a distal end of the corresponding lower side frame 31. The collision energy transmitted to each first diagonal member 36*a* is transmitted to the intermediate portion of the corresponding lower side frame 31 and the corresponding second diagonal member 36*b*.

Figure 5:
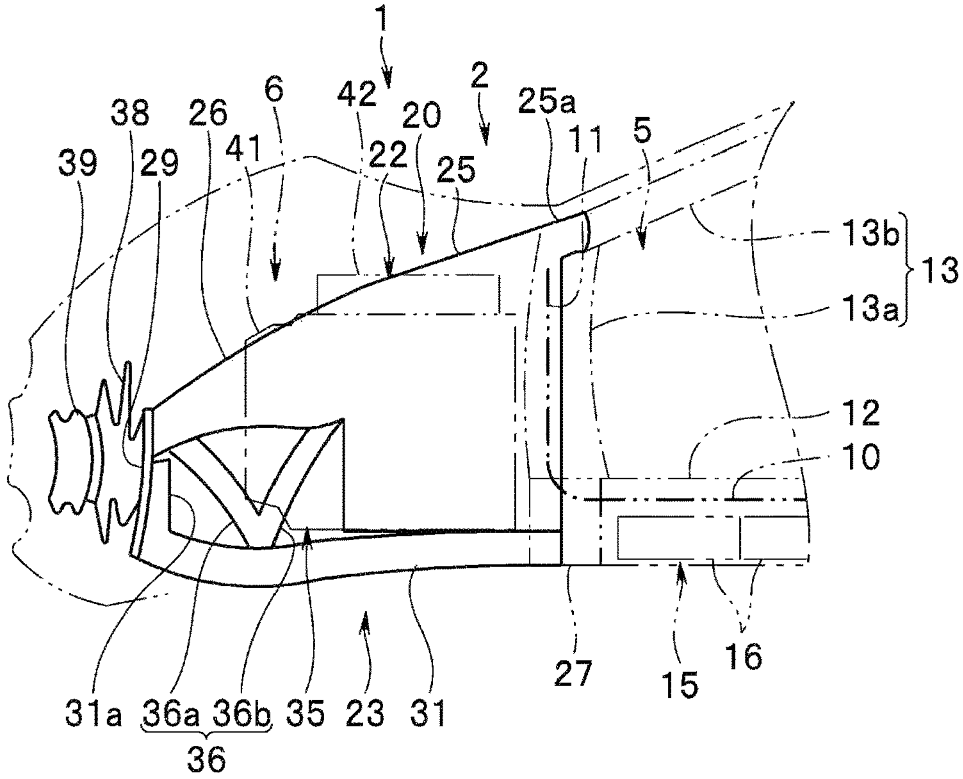
FIG. 5 is an explanatory view illustrating a behavior of the front frame structure in a middle stage in the event of the frontal collision.

The collision energy transmitted to each lower side frame 31 via the corresponding protrusion 31*a* and the corresponding first diagonal member 36*a* generates a moment in a direction in which a distal end side of the lower side frame 31 is rotated upward. Due to the generation of the moment, each lower side frame 31 starts to be axially crushed in which the lower side frame 31 is bent in a V-shape from joints between the lower side frame 31 and the first and second diagonal members 36*a* and 36*b* as starting points (see FIG. 5). Such axial crushing of each lower side frame 31 is controlled by, for example, the arrangement, strength, and the like of the corresponding reinforcement 36 so as to start in an earlier stage than the axial crushing of the corresponding arm-shaped portion 26.

Figure 6:
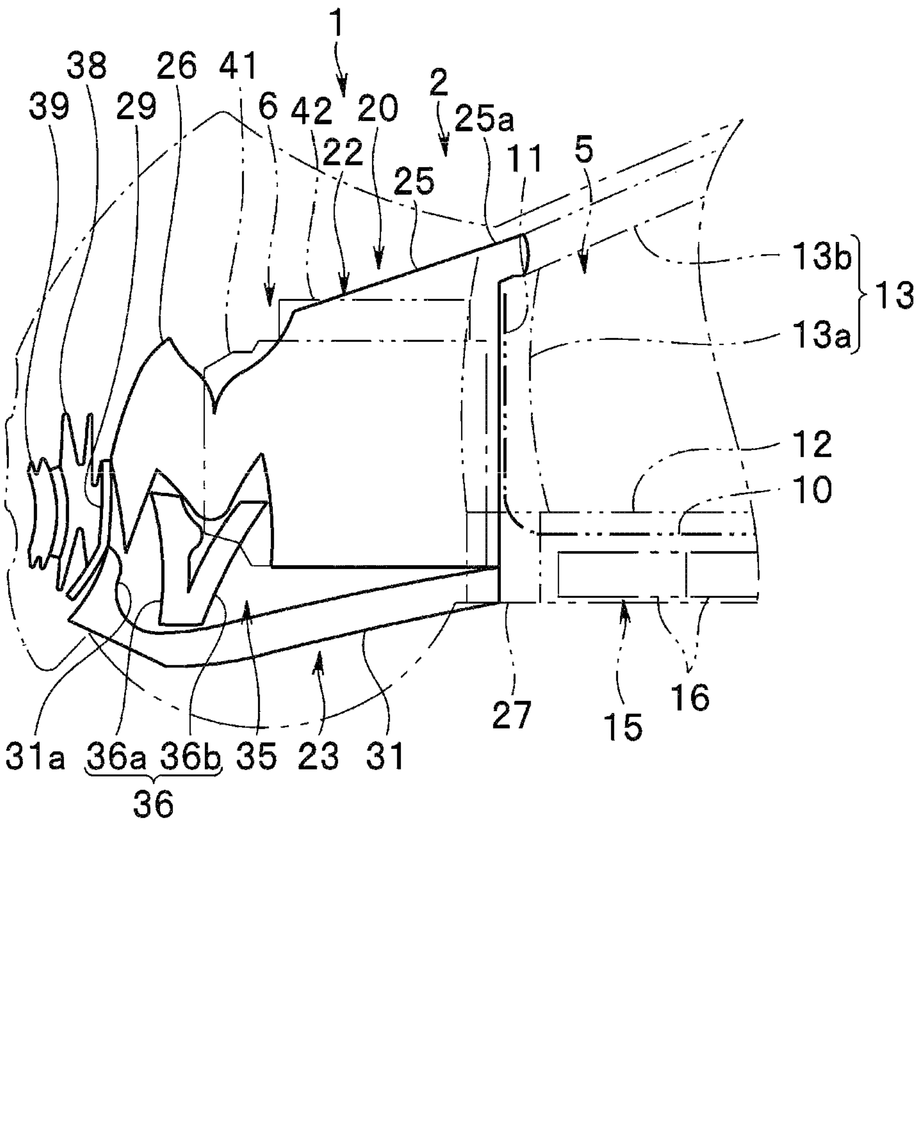
FIG. 6 is an explanatory view illustrating a behavior of the front frame structure in a final stage in the event of the frontal collision.

In a subsequent final stage of the collision, the axial crushing of each lower side frame 31 and the corresponding arm-shaped portion 26 progresses (see FIG. 6).

In this case, each lower side frame 31 starts to be axially crushed so as to bend in a V-shape from the middle stage of the collision. Thus, the axial crushing of each arm-shaped portion 26 is provided with a sufficient stroke without being hindered by the corresponding lower side frame 31. In addition, each lower side frame 31 is axially crushed in parallel with the axial crushing of the corresponding arm-shaped portion 26. Thus, collision energy in an event of a frontal collision is efficiently absorbed in a front region of the motor room 6.

The dimension in the height direction of the wall-shaped portion 25 of each front side frame 22 is set to be sufficiently larger than the dimension in the height direction of the arm-shaped portion 26. Accordingly, the rigidity of the wall-shaped portion 25 is set to be markedly higher than the rigidity of the arm-shaped portion 26.

Moreover, the lower portion of the rear end portion of the wall-shaped portion 25 is joined to the side sill 12, and further an upper portion of the rear end portion of the wall-shaped portion 25 is joined to the upper portion of the lower front pillar 13*a*. Accordingly, an impact load transmitted from the arm-shaped portion 26 to the wall-shaped portion 25 is efficiently dispersed to a vehicle body framework constituting the cabin 5.

With these configurations, crushing of the wall-shaped portion 25 is suppressed even when an impact load due to a frontal collision is transmitted. Thus, complete crushing of the motor room 6 is avoided, and a space in a rear region of the motor room 6 is maintained. The power unit 41 and the control unit 42 can be retained in the space of the rear region of the motor room 6. Thus, the retreat of the power unit 41 or the like, which is a rigid body, due to an impact load is suppressed, and deformation of the cabin 5 and the battery chamber 15 due to the power unit 41 or the like can be suppressed.

According to such an embodiment, a front frame structure 20 includes a front side frame 22 having a wall-shaped portion 25 that has a wall shape with a dimension in a height direction from a bottom portion to an upper portion of a motor room 6 and that extends in a front-rear direction of a vehicle body 2 in a rear region of the motor room 6, and an arm-shaped portion 26 that protrudes from an upper portion of a front end portion of the wall-shaped portion 25 and that extends in the front-rear direction of the vehicle body 2 in a front region of the motor room 6; a lower side frame 31 that is joined to a bottom portion of the wall-shaped portion 25 and a front end portion of the arm-shaped portion 26 and that has an annular opening 35 between the lower side frame 31 and the arm-shaped portion 26; and a reinforcement 36 disposed in the opening 35. The reinforcement 36 includes a first diagonal member 36*a* and a second diagonal member 36*b* coupled to each other. The reinforcement 36 is joined to the front end portion of the arm-shaped portion 26, a rear end portion of the arm-shaped portion 26, and an intermediate portion of the lower side frame 31. With these configurations, it is possible to perform design based on a front frame structure that is used for a vehicle in which a reciprocating engine is mounted, and it is possible to effectively protect the power unit 41 or the control unit 42, and the cabin 5 or the battery chamber 15 from an impact in an event of a head-on collision without impairing the design.

That is, various devices constituting a power unit using a reciprocating engine occupy a large volume in an engine room. For example, a lower space in the engine room is occupied by a crankshaft, an engine oil pan, and the like. An upper space in the engine room is occupied by a head space for intake and exhaust and the like.

In contrast, the power unit 41 for an electric vehicle can be markedly reduced in size as compared with a power unit constituted by a reciprocating engine or the like. Thus, when a front frame structure that is used for a vehicle in which a reciprocating engine is mounted is used as a base, the layout of the front side frame 22 can be developed in the up-down direction of the vehicle body 2 in the front frame structure 20 for an electric vehicle.

In the front frame structure 20 of the present embodiment, the rear region of the front side frame 22 is constituted by the wall-shaped portion 25 by effectively utilizing such an advantage in layout. Thus, the rigidity of the rear region of the front side frame 22 can be markedly increased.

Moreover, the arm-shaped portion 26 constituting the front region of the front side frame 22 protrudes from the upper portion of the front end portion of the wall-shaped portion 25. Thus, the front region of the front side frame 22 can be joined to the lower side frame 31 in an annular shape. The front regions of the front side frame 22 and the lower side frame 31 joined in an annular shape as described above can efficiently absorb an impact load. Thus, it is possible to more effectively suppress the deformation of the rear region (the wall-shaped portion 25) of the front side frame 22.

In addition, by providing the reinforcement 36 in the opening 35, part of the impact load transmitted to the arm-shaped portion 26 can also be dispersed to the lower side frame 31. In this case, by joining the reinforcement 36 to the front end portion of the arm-shaped portion 26, the rear end portion of the arm-shaped portion 26, and the intermediate portion of the lower side frame 31, it is possible to control the starting point when the lower side frame 31 is axially crushed. By controlling the starting point of the axial crushing of the lower side frame 31 to an appropriate position, a crush stroke for impact absorption by the arm-shaped portion 26 and the lower side frame 31 can be appropriately ensured in the front region of the motor room 6.

Thus, the space in the rear region of the motor room 6 can be maintained even in an event of a frontal collision without extending the front side frame 22, the crash box 38, and the like forward.

In this case, the number of positions at which the reinforcement 36 is joined to the arm-shaped portion 26 is set to be larger than the number of positions at which the reinforcement 36 is joined to the lower side frame 31. Further, the reinforcement 36 has the truss structure in the opening 35. Thus, the impact load dispersed from the arm-shaped portion 26 to the reinforcement 36 can be accurately transmitted to the intermediate portion of the lower side frame 31, and the axial crushing of the lower side frame 31 can be appropriately controlled.

Moreover, since the wall-shaped portion 25 has the dimension in the height direction, the rear end portion of the wall-shaped portion 25 can be coupled to the side sill 12 and to the front pillar 13. Thus, it is possible to efficiently disperse the impact load transmitted to the wall-shaped portion 25 and to more effectively suppress the crushing of the wall-shaped portion 25.

Further, since the wall-shaped portion 25 has the dimension in the height direction, the panels constituting the wall-shaped portion 25 can constitute a portion of the suspension tower 30. Thus, the rigidity of the suspension tower 30 can also be increased.

The disclosure described in the above-described embodiment is not limited to the embodiment. In the stage of implementation, various modifications can be implemented within the scope not departing from the idea of the disclosure. Further, the above-described embodiment includes disclosures in various stages. Various disclosures can be extracted from appropriate combinations of the disclosed multiple components.

For example, even though some components are deleted from all the components described in the embodiment, the configuration from which the components are deleted can be extracted as a disclosure as long as the described problem can be solved and the described effect can be obtained.

The invention claimed is:

1. A front frame structure for an electric vehicle, the front frame structure comprising:

a front side frame comprising a wall-shaped portion that has a wall shape with a dimension in a height direction from a bottom portion to an upper portion of a motor room of the electric vehicle and that extends in a front-rear direction of a vehicle body of the electric vehicle in a rear region of the motor room, and an arm-shaped portion that protrudes from an upper portion of a front end portion of the wall-shaped portion and that extends in the front-rear direction of the vehicle body in a front region of the motor room;

a sub-frame that is joined to a bottom portion of the wall-shaped portion and a front end portion of the arm-shaped portion as to define an annular opening between the sub-frame and the arm-shaped portion, said sub-frame having a lower side frame that extends in the front-rear direction of the vehicle body and which is joined to a lower surface of the wall-shaped portion; and a load transmission member disposed in the annular opening, wherein the load transmission member comprises two or more diagonal members coupled to each other, and wherein the load transmission member is joined to at least the front end portion of the arm-shaped portion, a rear end portion of the arm-shaped portion, and an intermediate portion of the sub-frame, and wherein the lower side frame, arm-shaped portion and load transmission member are arranged such that an axis, which extends in the vehicle height direction through the arm-shaped portion, also extends through each of the load transmission member and the lower side frame of the sub-frame.

2. The front frame structure for an electric vehicle according to claim 1, wherein a number of positions at which the load transmission member is joined to the arm-shaped portion is larger than a number of positions at which the load transmission member is joined to the sub-frame.

3. The front frame structure for an electric vehicle according to claim 1, wherein the load transmission member has a truss structure in the annular opening.

4. The front frame structure for an electric vehicle according to claim 1, wherein an upper portion of a rear end portion of the wall-shaped portion is joined to a front pillar of the vehicle body.

5. The front frame structure for an electric vehicle according to claim 1, wherein a lower portion of a rear end portion of the wall-shaped portion is joined to a side sill via a torque box of the vehicle body.

6. The front frame structure for an electric vehicle according to claim 3, wherein the truss structure comprises a first diagonal member of the two or more diagonal members and a second diagonal member of the two or more diagonal members, with the first diagonal member having a forward most end joined with the front end portion of the arm-shaped portion and the second diagonal member having a rearward most end joined to the rear end portion of the arm-shaped portion.

7. The front frame structure for an electric vehicle according to claim 6, wherein a forward most end of the second diagonal member and a rearward most end of the first diagonal member converge to form a truss vertex at a joining location on an upper surface of the intermediate portion of the sub-frame.

8. The front frame structure for an electric vehicle according to claim 3, further comprising a protrusion extending vertically up from a forward end of the lower side frame of the sub-frame and into contact with an undersurface of the front end portion of the arm-shaped portion, and the truss structure having a forward most end extending to a joint portion located where the protrusion is joined to the undersurface of the front end portion of the arm-shaped portion.

9. The front frame structure for an electric vehicle according to claim 1, further comprising an upper panel forming an upper surface of the wall-shaped portion, and wherein a portion of the upper panel that is expanded on an outer side in the vehicle width direction of the wall-shaped portion defines a portion of a vehicle suspension tower.

10. The front frame structure for an electric vehicle according to claim 1, wherein the wall-shaped portion extends along the lower side frame in the front-rear direction of the vehicle body from a rear location at a vehicle toeboard to a center region of the motor room.

11. A front frame structure for an electric vehicle, the front frame structure comprising:

a front side frame comprising a wall-shaped portion that has a wall shape with a dimension in a height direction from a bottom portion to an upper portion of a motor room of the electric vehicle and that extends in a front-rear direction of a vehicle body of the electric vehicle in a rear region of the motor room, an arm-shaped portion that protrudes from an upper portion of a front end portion of the wall-shaped portion and that extends in the front-rear direction of the vehicle body in a front region of the motor room, and an upper panel forming an upper surface of the wall-shaped portion, and wherein a portion of the upper panel, which forms the upper surface of the wall-shaped portion, extends outward, in the vehicle width direction, away from an outer side of the wall-shaped portion as to define a portion of a vehicle suspension tower, and such that the upper surface of the wall-shaped portion and an upper surface of the vehicle suspension tower are each at a common height which is equivalent to the height representing the upper portion of the motor room;

a sub-frame that is joined to a bottom portion of the wall-shaped portion and a front end portion of the arm-shaped portion as to define an annular opening between the sub-frame and the arm-shaped portion; and a load transmission member disposed in the annular opening, wherein the load transmission member comprises two or more diagonal members coupled to each other, and wherein the load transmission member is joined to at least the front end portion of the arm-shaped portion, a rear end portion of the arm-shaped portion, and an intermediate portion of the sub-frame.

12. The front frame structure for an electric vehicle according to claim 11, further comprising an upper side frame extending in the front-rear direction of the vehicle body and having a rearward portion configured for joining to an upper end portion of a vehicle lower front pillar, and wherein an upper end portion of the suspension tower, on the outer side in the vehicle width direction, is joined to the upper side frame.

13. A front frame structure for an electric vehicle according to claim 11, wherein a dimension in the height direction of the arm-shaped portion decreases from a rear end toward a front end of the arm-shaped portion.

14. The front frame structure for an electric vehicle according to claim 11, wherein the wall-shaped portion extends along the sub-frame in the front-rear direction of the vehicle body from a rear location at a vehicle toeboard to a center region of the motor room.

15. The front frame structure for an electric vehicle according to claim 11, wherein the sub-frame, arm-shaped portion and load transmission member are arranged such that an axis, which extends in the height direction through the arm-shaped portion, also extends through each of the load transmission member and the sub-frame.

16. A front frame structure for an electric vehicle, the front frame structure comprising:

a front side frame comprising a wall-shaped portion that has a wall shape with a dimension in a height direction from a bottom portion to an upper portion of a motor room of the electric vehicle and that extends in a front-rear direction of a vehicle body of the electric vehicle in a rear region of the motor room, and an arm-shaped portion that protrudes from an upper portion of a front end portion of the wall-shaped portion and that extends in the front-rear direction of the vehicle body in a front region of the motor room;

an upper side frame extending in the front-rear direction of the vehicle body;

a suspension tower that, relative to the vehicle width direction, is positioned between the upper side frame and an outer wall of the wall-shaped portion;

a sub-frame that is joined to a bottom portion of the wall-shaped portion and a front end portion of the arm-shaped portion as to define an annular opening between the sub-frame and the arm-shaped portion; and a load transmission member disposed in the annular opening, wherein the load transmission member comprises two or more diagonal members coupled to each other, and wherein the load transmission member is joined to at least the front end portion of the arm-shaped portion, a rear end portion of the arm-shaped portion, and an intermediate portion of the sub-frame, and wherein said dimension in the height direction from the bottom portion to the upper portion of the motor room of the wall-shaped portion is substantially the same as the height of the upper side frame in said height direction.

17. The front frame structure for an electric vehicle according to claim 16, further comprising an upper panel forming an upper surface of the wall-shaped portion, and wherein a portion of the upper panel that is expanded on an outer side in the vehicle width direction of the wall-shaped portion defines a portion of the vehicle suspension tower.

18. The front frame structure for an electric vehicle according to claim 16, wherein the sub-frame, arm-shaped portion and load transmission member are arranged such that an axis, which extends in the height direction through the arm-shaped portion, also extends through each of the load transmission member and the sub-frame.

* * * * *